United States Patent [19]

Perper

[11] Patent Number: 5,003,231
[45] Date of Patent: Mar. 26, 1991

[54] ADAPTIVE RESONANT BALLAST FOR DISCHARGE LAMPS

[75] Inventor: Lloyd J. Perper, Tucson, Ariz.

[73] Assignee: Peroxidation Systems, Inc., Tucson, Ariz.

[21] Appl. No.: 336,869

[22] Filed: Apr. 12, 1989

[51] Int. Cl.$^5$ ............................................. H05B 41/36
[52] U.S. Cl. .................................. 315/291; 315/307; 315/209 R; 315/DIG. 7
[58] Field of Search ................... 315/291, 209 R, 194, 315/199, 246, 160, 161, DIG. 7, 224, 226, 171, 307, 219

[56] References Cited

U.S. PATENT DOCUMENTS

| | | | |
|---|---|---|---|
| 4,060,752 | 11/1977 | Walker | 315/244 |
| 4,277,728 | 7/1981 | Stevens | 315/307 |
| 4,395,659 | 7/1983 | Aoike et al. | 315/209 R |
| 4,560,908 | 12/1985 | Stupp et al. | 315/219 |

Primary Examiner—Eugene R. LaRoche
Assistant Examiner—Ali Neyzari
Attorney, Agent, or Firm—Daniel C. McKown; James F. Cottone

[57] ABSTRACT

A control circuit utilizing the impedence transforming attributes of ballast/filter networks is disclosed for energizing high intensity gas discharge lamps, wherein the output amplitude and/or duty cycle of a power frequency waveform produced by a switching inverter is controlled using feedback techniques. A basic embodiment teaches the use of energy removal from the input inductor of a low pass ballast/filter positioned between a switching inverter operating at 30 kHz and a gas discharge lamp load to serve as a feedback source, while an alternate embodiment teaches the use of this feedback source as a signal for controlling the duty cycle of the constant frequency square waves produced by the inverter. These and other control circuits disclosed are particularly applicable for energizing high intensity discharge lamps of the types exhibiting very irregular characteristics, and for providing their desirable constant current controlling and protective features for the full range of lamp operating phases including lamp starting, constant power operation, and lamp restarting.

19 Claims, 2 Drawing Sheets

ADAPTIVE RESONANT BALLAST FOR DISCHARGE LAMPS

BACKGROUND OF THE INVENTION

1. Field of the Invention

The present invention relates generally to the field of energizing high intensity discharge lamps of the types having irregular characteristics which require ballast elements to control their power levels, and more particularly to closed loop control circuitry for energizing these lamps under a variety of lamp operating conditions. Specifically, the invention discloses apparatus for energizing these lamp loads using very useful attributes of certain filter networks operated under closely controlled conditions as an intrinsic part of the control techniques disclosed.

2. The Prior Art

The use of ballast elements of many types as integral portions of discharge lamp energizing circuits are, of course, well known in the electrical powering arts. A wide variety of methods and apparatus have evolved over the years to address the particular challenges offered by gas discharge lamps due to the irregular and variable volt/amp characteristics. Because the light emitting benefits offered by these lamps are significant, circuit designers have been impelled to accommodate drive circuitry to the lamp characteristics despite the inconstancy of these characteristics as the lamps have been improved and changed over the years.

High intensity gas discharge lamps, such as mercury vapor or sodium vapor types, particularly exhibit these very irregular characteristics, and as higher and higher lamp power levels are achieved, energizing methods and apparatus have had to become more astute. This is especially true due to the higher potentially destructive voltages and currents encountered in these recent lamp/power supply systems.

Prior art devices have long been directed to the disparate tasks of initially igniting these lamps (using voltages many times higher than their rated voltages); thereafter maintaining constant power levels for normal operating conditions (using more energy efficient coupling networks); and finally restarting hot or cold lamps whose plasma may have extinguished (using in many cases complex ignition and/or re-ignition approaches). For each of these operating phases, prior art designs have proposed to achieve some of the above desirable control features while minimizing heating and overloading effects, and avoiding destructively high transient voltages and currents.

Early prior art devices and circuits which addressed one or more of these varied requirements for energizing gas discharge lamps outlined above may be found in U.S. Pat. Nos. 2,659,037 to Claude and 3,519,881 to Engel et al. In the 1953 Claude patent, a form of resonant LC network operating at the power line frequency (220 VAC, 50 Hz is disclosed for operating an argon/mercury lamp, and uses a relay to switch additional reactances into the lamp powering circuit once the starting or ignition of the lamp has been achieved.

The 1970 Engel et al. patent also discloses a discharge lamp starting and operating circuit including ballast elements operated at line frequency (60 Hz), but one which generates a complex waveform having within each half cycle a very short high voltage, low energy ignition pulse a high energy starting pulse at twice line voltage needed for some lamps, and an extended normal voltage continuation.

More contemporary discharge lamp energizing approaches increasingly employ switching inverter power sources enabling them to exercise more design control over various aspects of circuit/load conditions. In this latter group are U.S. Pat. Nos. 4,277,728 to Stevens, 4,060,752 to Walker, and 3,611,021 to Wallace.

Both the Stevens and Wallace patents rely on controlling the operating frequency of switching type power inverters which apply their square wave outputs via inductor/resonant networks to high intensity discharge lamp loads. In the Walker patent, feedback signals are used to increase the inverter oscillator frequency with increasing load impedance to provide constant output power. The Stevens patent teaches the use of quadrature phase detection circuitry to control the switching frequency so that the inverter feeds a resistive load through a resonant network.

In U.S. Pat. No. 4,748,551, Dickey describes a circuit useful for maintaining a constant flow of current in spite of variations in the resistance of a load. The circuit includes a transmission line having a delay equal to an odd number of quarter cycles of a fundamental.

Therefore, it is clear that while considerable effort has been directed over the years to the problems associated with energizing gas discharge lamps, there continues to be a need for more capable circuitry that more adroitly meets the needs of recently available higher powered lamps, and that incorporates recently developed solid state circuitry for its implementation. The adaptive resonant control circuits taught in the present invention admirably meet these needs, and provide a significant improvement to the art of energizing discharge lamp loads of markedly irregular characteristics.

SUMMARY OF THE INVENTION

It is therefore a primary object of the present invention to provide improved control circuits for energizing high intensity discharge lamps.

Another object of the present invention is to provide a control circuit using a semi-active resonant ballast capable of adaptively adjusting to the changing characteristics in the various conditions of lamp operation.

A further object of the present invention is to minimize the heating and overload effects of reactive power in a switching semiconductor power source included within the control circuit (which supplies a substantially constant voltage) while supplying the lamp with a substantially constant desired current level during regular operation.

Yet a further object of the present invention is to provide a control circuit using a semi-active resonant ballast and a switching power source of the inverter type which, during start or restart, generates a high starting potential which decreases rapidly after ignition with current sufficiently large for ignition, but which is limited by feedback techniques so as to avoid power overload during these elevated voltage levels.

By means of a number of preferred embodiments, the present disclosure teaches broad principles of using certain useful attributes of well-known filter networks to implement reliable means for a passive resonant low-pass filter to transform power from a voltage source into a current source and to generate a high voltage suitable for gas discharge lamp ignition. The action of the ballast/filter network is controlled by use of one or more feedback loops that provide desired amplitude controlling actions when employed in combination with the impedance-transforming action of the various networks described. These desirable controlling actions are notable during lamp starting, restarting, normal operations, lamp failure, or under lamp overload conditions.

Typical implementations show the use of a constant-k, low pass filter which attenuates all harmonics of the square wave produced by the switching inverter, and discloses producing a nearly sinusoidal current in the load; however, it should be understood that other filter types and other circuit variations based on this impedence transforming attribute are also usable.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENTS

Figure 1:
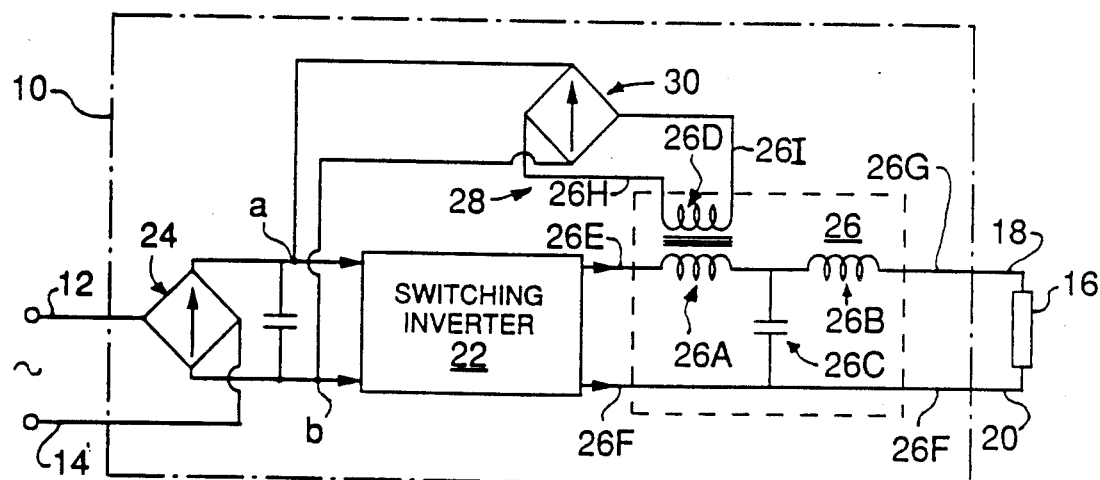
FIG. 1 is an overall system block diagram of an adaptive resonant ballast control circuit according to the present invention.

Referring now to FIG. 1, there is shown a basic preferred embodiment of an adaptive resonant ballast control circuit according to the present invention. Before examining the control circuit in detail, it is useful first to consider an overview of the circuit structures and functions in general terms in order to appreciate the various system aspects of the circuitry in their broadest terms.

Briefly, the control circuit 10 including its supporting circuitry and controlling techniques is ideally configured to energize high intensity lamps of the types having highly irregular voltage/current characteristics by adaptively converting a source of input electrical power into excitation suitable for the various lamp loads, while avoiding the problems associated with their highly variable requirements. The term "energized" is used herein in its broadest sense to include initially starting the lamps, as well as thereafter powering the lamps at the desired levels, and restarting the lamps (hot or cold) as necessary.

The control circuit 10 is shown as receiving an input AC power on lines 12 and 14 and applying a suitably processed version of this power to one or more high intensity discharge (HID) lamp loads 16 via a pair of output lines 18 and 20. The control circuit 10 is shown as including a switching inverter section 22 that is energized via the output of an input circuit 24 (shown, illustratively, as a full wave bridge rectifier) and applies its high frequency output waveform to the input of a ballast/filter section 26. The ballast 26 in turn drives the lamp 16 with proper voltages, and at desired current levels A feedback section 28 receives electrical outputs/signals from the ballast 26 and applies processed versions of these to the switching inverter 22 via an input node designated by the letters "a" and "b."

Figure 5:
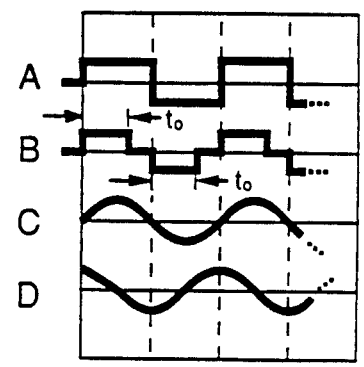
FIGS. 5A-5D depict various waveforms encountered in the preferred embodiments of FIGS. 1-3.

In operation, the input circuit 24 receives input AC power at 60 Hz; full wave rectifies this to the 300-600 VDC level and applies this DC voltage to the switching inverter 22. The switching inverter 22 produces a power frequency waveform of the types shown in FIGS. 5A or 5B at frequencies higher than 10 kHz, and applies this to the ballast 26. The ballast 26, both filters and ballasts to apply an output sinusoidal waveform of the types shown in FIGS. 5C or 5D to the lamps 16. The feedback section 28 provides coupling of thresholded/processed versions of the output sinusoidal waveforms to the "a/b" node, thereby producing closed loop controlling action by the control circuit 10. The feedback section 28 is shown as including a full wave bridge rectifier 30 as part of its processing circuitry. This entire closed loop controlling action adapts to the operating modes called for by the condition of the lamp so as to provide a desired level of lamp current while preventing destructively high levels of excitation voltages and/or currents within the control circuit 10 components, or its associated loads, or the interconnecting wiring.

In the description below, the following conventions and terminology will be used. The input node to the inverter is designated as the input node a/b; the one or more lamps providing the load for the control circuit is designated as lamp load(s) 16; and the multiple role ballast/filter 26 is designated as either the ballast 26 or the ballast/filter 26.

Turning now to the circuitry details, the ballast/filter 26 is shown as a full section low pass filter network of the constant-k type having an input inductor 26A in series with an output inductor 26B, and a shunt capacitor 26C positioned at their common point to yield a conventional "T" arrangement.

In its low pass filter role, the ballast/filter 26 functions to remove effectively all of the odd harmonics from the power frequency waveform (the square waves of FIGS. 5A and 5B) applied via the switching inverter 22, thereby applying substantially sinusoidal excitation to the lamp load(s) 16. The resistive lamp load(s) result in the lamp currents also being sinusoidal.

In its ballasting role, the ballast/filter 26 with its input inductor 26A includes a core via which a secondary winding 26D is coupled. The ballast/filter 26 therefore has an input port via the lines 26E and 26F, an output port via the lines 26G and 26F, and a feedback port via the lines 26H and 26I.

The switching inverter 22 may be any one of the well known and conventional types, particularly those which have a self-contained frequency source for synchronizing the on/off gating of solid state power switching devices such as SCR's, TRIACS, MOSFETS, and the like.

In use, a number of special properties of this ballast/filter network contribute significantly to the control advantages provided by the present invention. A primary attribute of this type of filter network is its ability to deliver a substantially constant load current despite variations in load impedance when energized by a constant input voltage at a frequency which causes quadrature phase delay through the filter. By selecting a system operating frequency at which the high intensity discharge lamps exhibit a resistive impedance, and by providing a ballast/filter 26 whose lumped parameters produce a 90-degree phase shift at the particular frequency selected, the ballast/filter 26 becomes an impedance inverting transformer. In filter theory, this occurs when the filter's angular cutoff frequency $\omega_c$ is equal to the $\sqrt{2}$ times the applied excitation frequency $\omega_1$ (when the filter impedance arms are pure reactances with no losses) At that particular operating frequency, the ballast/filter 26 exhibits an input impedance that is equal to the reciprocal of the lamp load impedance (which is resistive) multiplied by the square of the filter's characteristic impedance:

$$Z_{in} = (Z_o)^2 \div (Z_R).$$

The importance of these filter network factors becomes apparent in practical terms when taken in combination with typical high intensity discharge lamps' impedance characteristics, and their usual operating environments Ordinarily, the lamps 16 start at a reduced voltage, such as 60 percent of their normal rated value, when they are initially energized and are still cold. Driven by a constant current control circuit, the lamps gradually heat up and the applied voltage approaches its normal value. Constant current control results in a desirable gradual increase of power to a steady level. However, if for any reason the driving power is removed, even briefly, a much higher voltage (several times normal) is needed to reignite the lamps and the excitation power must be limited during restart to prevent damage to the lamp. In the case of some types of lamps, nondestructive restart may first require a complete cool-down.

In concrete terms, consider the lamp load(s) 16 as being typical discharge lamps, such as a mercury or sodium vapor type, having a rating of 1.25 KW calling for 5 amps at 250 volts. (All sinusoidal currents and voltages are given herein in rms values.) These types of lamps are substantially resistive at a typical frequency of 30 kHz, and in this example the lamp resistance is taken as 50 ohms. ($250 \div 5$) For a ballast/filter 26 having a characteristic impedance Zo of 50 ohms, its input impedance $Z_{in}$ would be $(50)^2 \div (250 \div 5) = 50$ ohms, which matches the lamp load impedance. However, if the lamp first ignites at 60 percent of its rated 250 volts (i.e., at 150 volts) the input impedance of ballast/filter 26 becomes 83 ohms, $(50)^2 \div (150 \div 5)$, and the power drawn by it would be 750 watts, which gradually will increase to its rated 1.25 KW.

If the lamp extinguishes while being normally powered as in the above example, destructive voltages and currents could occur in the absence of the protective features provided by the control circuit 10. Basically, an extinguished lamp exhibits infinite resistance, which would make the input impedance of ballast/filter 26 tend toward zero ohms. $Zin = (50)^2 \div (\infty) \infty 0$. This would lead to excessively high currents being drawn from the switching inverter 22, and further to the voltage output from the ballast 26 increasing beyond component and/or wiring breakdown limits. The means for preventing this are provided in the control circuit 10 by the operation of feedback section 28. Avoidance of these catastrophic voltage and current buildups is based—in a first instance—on the extraction of energy from the ballast/filter 26 when its voltage exceeds a predetermined value, which is generally determined by lamp restart parameters. When the peak voltage across the secondary winding 26D exceeds the DC voltage from the input circuit 24 applied to the input node a/b of the switching inverter 22, the increase in voltage across the input inductor 26A returns energy to the input node a/b, and the voltage across the input inductor 26A is substantially limited to values less than a multiple of the applied DC voltage determined primarily by the turns ratio of the windings 26A and 26D. The output voltage of the ballast/filter 26 is thereby limitable to a level such as 5 to 10 times normal lamp voltage as might be required for a restart. The current drawn by the ballast/filter 26 is also limited since the effective resonant quality (Q) of the input inductor 26A is reduced by this extraction of energy.

Additional protection is provided by the control circuit 10—in a second instance—based on limiting excessive voltage buildup during open circuit load conditions by the closed loop action within the feedback section 28. AC voltage induced in the secondary winding 26D is converted into a DC feedback voltage by the bridge rectifier 30 and applied, as previously described, to the input node a/b of the switching inverter 22. Under open circuit load conditions, the input inductor 26A and capacitor 26C of the ballast/filter 26 comprise a series resonant load at 30 kHz, and the voltage across the inductor 26A will build up until it is limited by the nonlinear feedback loop 28 to the DC voltage provided by the input circuit 24. This will provide the desired restarting levels as described above, rather than the more destructive voltage levels which could be much greater than 10 times rated values.

Figure 4:
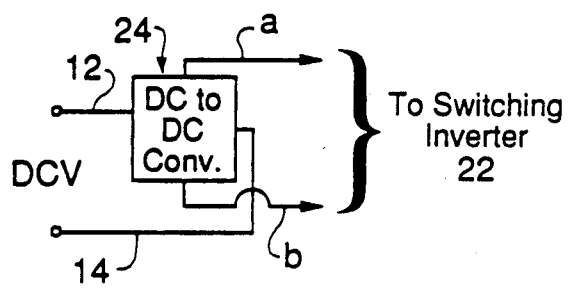
FIG. 4 is a simplified block diagram of an alternate input circuit employing a DC-to-DC converter.

Referring briefly to FIG. 4 in addition to FIG. 1, a modified form of the input circuit 24 is shown. The modified input circuit 24* is shown as a DC-to-DC converter suitable for converting an input DC power source on the lines 12 and 14 into DC voltage at levels similar to those previously described for application to the switching inverter 22. The overall operation of the control circuit 10 is the same as described above, the sole difference being system operation from a DC power source rather than from the more frequently encountered AC power sources. The modified input circuit 24* may include solid state conversion circuitry of conventional arrangements.

Figure 2:
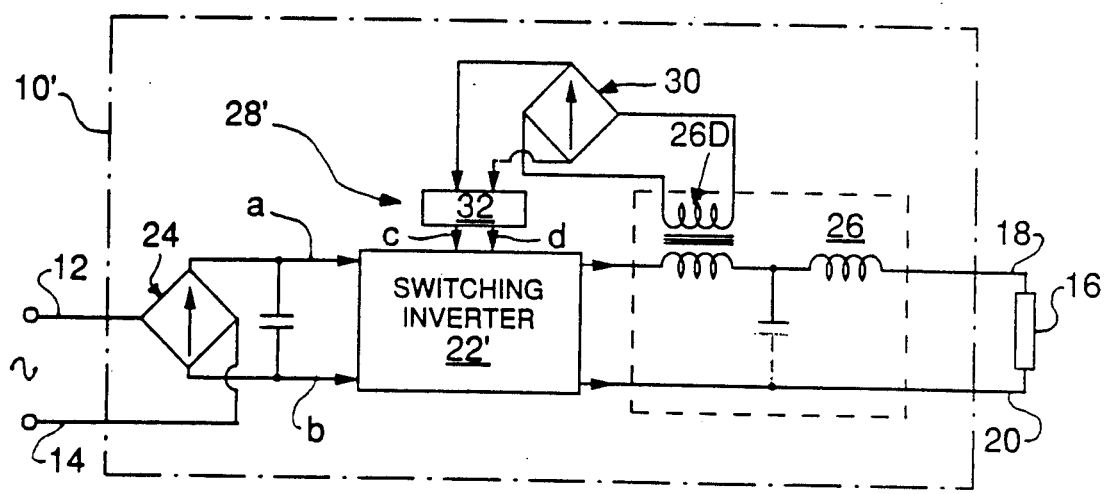
FIG. 2 is an overall system block diagram of an alternate adaptive resonant ballast control circuit using duty cycle control according to the present invention.

Referring now to FIG. 2 there is shown an alternate preferred embodiment of the control circuit according to the present invention. A modified control circuit 10' is specially configured to include duty cycle control for achieving improved energization of HID lamp loads. Most elements of the control circuit 10' function identically to their like-numbered counterparts of the basic control circuit 10, but several additional elements are included in the feedback section 28'. For simplicity of exposition, some subelement designations in the ballast/filter 26 area have been omitted, but except as described below, they are arranged and operate as previously described.

The feedback section 28' includes a duty cycle control unit 32 which receives the DC feedback voltage derived from the winding 26D and rectified by the bridge rectifier 30. The duty cycle unit 32 processes this voltage into gating signals for application via a second input port c/d to a modified switching inverter 22'. Whereas the previously described switching inverter 22 produced a power frequency waveform of the simple square wave type shown in FIG. 5A, the present switching inverter 22' produces a power frequency waveform of the duty cycle controlled square wave type shown in FIG. 5B. As shown, the periodic pulses have an adjustable duration $t_o$ which is established in response to gating signals produced in the duty cycle unit 32.

The duty cycle unit 32 may include commercially available LSI circuitry such as those multipurpose pulsewidth control types designated as TL494CJ (made by Motorola Semiconductor Products, among others) or SG1525J (made by Silicon General, Inc., and others) to produce the desired gating signals.

In action, the duty cycle unit 32 produces turnoff signals which correspond in time to the magnitude of the DC feedback voltage, thus providing a duty cycle controlled output waveform having symmetrical on-time durations $t_o$ of its "high" and "low" portions for application to the input of the ballast/filter 26. This waveform also at 30 kHz, provides the desired closed loop control of lamp energization relying largely on controlling the amplitude of the effective voltage that produces a desired constant level of lamp current. During restarting, lamp current is of course a transient function. The control circuit 10' tends to maintain a constant lamp load rms current, but the starting voltage is briefly much higher than normal and drops rapidly thereafter. Depending on the lamp characteristics, destructive short-term power peaks are possible, whose effects can be mitigated by reducing the duty cycle to a level that lowers the energy delivered at high voltage without extinction of the plasma within these lamps Additionally, the lamp current is continuously variable by adjusting the on-time duration of the power frequency waveform, leading to the ability to controllably adjust lamp intensity during normal operation. Further, the duty cycle control approach available via the control circuit 10' is usable in any condition of lamp operation, as compared with the basic control circuit 10 which could be limited to operation only when thresholded current-/voltage levels are exceeded.

Beyond the two preferred embodiments of HID lamp control circuits described above, additional variations based on exploitation of the impedance transforming attributes of properly configured and driven ballast/filter networks are contemplated as part of the present invention. One such variation is shown in the further preferred embodiment of FIG. 3. An additionally modified control circuit 10" is arranged to include an artificial delay line 26" as the ballast/filter element, and further includes a separate transformer 34 in a modified feedback loop 28" to provide the feedback signal voltage. The ballast/filter 26" is shown as comprising a plurality of cascaded L half-sections of series inductors and shunt capacitors (not individually designated) arranged to implement a broad band artificial delay line, whose output is applied to the lamp load(s) 16. A primary winding of a transformer 34 is connected in parallel with the output of the ballast/filter 26", and its secondary is applied to the bridge rectifier 30. The resulting DC feedback voltage is routed back to the input node a/b of the switching inverter 22, as in the embodiment of FIG. 1. By referencing the voltage at the output of the ballast/filter 26" (rather than the internal voltage across an input inductor as in the control circuit 10"), a more general control capability is obtained. The DC voltage source fed back to the node a/b after passing through the transformer 34, of arbitrary turns ratio, is such as to readily limit the output voltage swing to a level consistent with lamp restart voltage requirements, but less than would produce voltage breakdown at the ballast/filter 26" output, or current overload in the switching inverter 22 as a result of impedance inversion.

The feedback section 28" components (transformer 34, and rectifier 30) will entail relatively small power losses so that the output voltage will be clamped through a low resistance path during the nonconductive part of this cycle (which is most of the cycle during open circuit operation for the square wave case). The current output of the ballast/filter 26" will then occur at a finite multiple of the DC voltage rather than at a runaway voltage with no load on the ballast/filter 26". The current drawn from the switching invert 22 is in a manageable multiple of that drawn in normal operation, rather than what would be drawn by a reflected short circuit.

Figure 3:
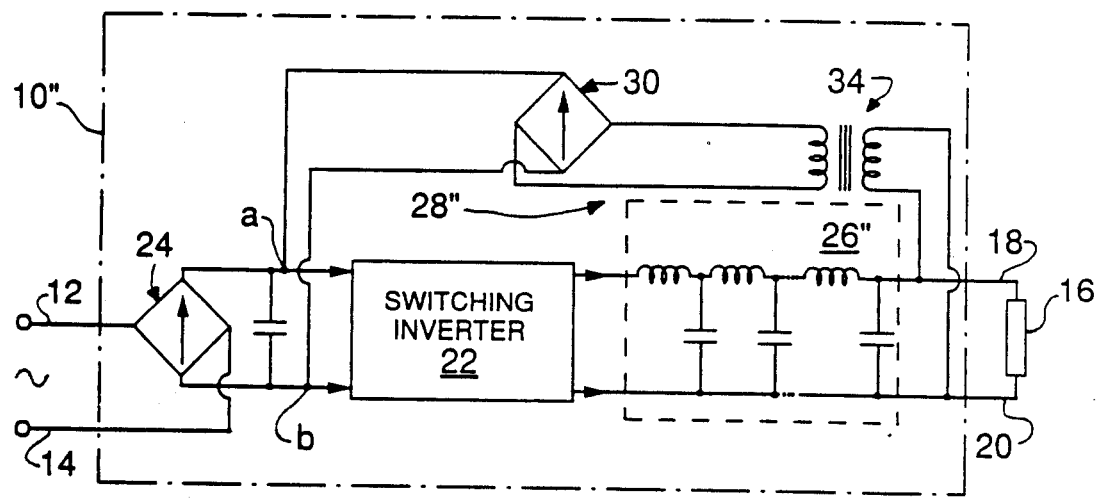
FIG. 3 is an overall system block diagram of a further alternate adaptive resonant ballast control circuit using a delay line type network according to the present invention.

Although the present invention has been described in terms of selected preferred embodiments the invention should not be limited thereto, since other embodiments and modifications would readily occur to one skilled in the art. For instance, if the output transformer configuration of FIG. 3 is used with the single section ballast-/filter of FIG. 2 rather than the delay line type shown, the advantage over the circuit of FIG. 1 will obtain, in that the clamped quality is the actual ballast output. The phase angle of the nonlinear load seen by the switching inverter 22 during lamp open circuit operation can be less reactive with the output inductor functioning as part of the feedback circuit. Additionally, use of an m-derived low pass filter in lieu of the described constant-k type is also contemplated.

In another alternative implementation, the duty cycle unit 32 may be replaced by a frequency modulator which converts the feedback voltage from 30 to varying the frequency deviation (and thereby spreading of the frequency spectrum) produced in switching inverter 22' of FIG. 2. Since filter 26 passes only the fraction corresponding to the fundamental frequency of the frequency modulation, and since that fraction will decrease with increasing f-m, a similar inhibiting effect to that of duty-cycle-narrowing modulation will be realized at the load as the output of 26 increases.

It is therefore to be understood that the appended claims are intended to cover all such modifications as fall within the true spirit and scope of the invention.

What is claimed is:

1. A control circuit for energizing a gas discharge lamp over a wide range of lamp operating conditions, comprising:
    (a) an input circuit for converting applied input power into a substantially DC voltage at its output;
    (b) an inverter having first and second input nodes, said first node connected to receive said DC voltage for converting said DC voltage into a power frequency waveform at a particular frequency at its output, said second node adapted to receive a feedback signal for controlling the duty cycle of said output power frequency waveform;
    (c) a ballast comprising a low pass filter having an input inductor and an output inductor, said ballast connected to receive said duty cycle controlled power frequency waveform and to provide a desired output current to the discharge lamp, said ballast exhibiting at said particular frequency a quadrature phase shift causing a reciprocal impedance transformation between its input and output;
    (d) a feedback circuit connected to said ballast and to said inverter node for controlling the output current-providing ability of said inverter, said feedback circuit comprising:
        (i) a secondary winding inductively coupled to said input inductor for removing energy therefrom;

(ii) a rectifier to convert said removed energy into a DC feedback voltage;

(iii) a solid state duty cycle circuit for converting said DC feedback voltage into a feedback signal applied to said second node for said duty cycle control;

(e) wherein said power frequency waveform is set at a particular frequency such that said discharge lamp exhibits substantially resistive impedance to said ballast; and;

(f) whereby output current above a predetermined level causes a DC feedback voltage to alter the duty cycle of said power frequency waveform so as to restore and maintain said desired output current.

2. The control circuit of claim 1 wherein said input power is AC and said input circuit is a bridge rectifier, said inverter further comprising one or more solid state switching elements operating at said particular frequency to produce a duty cycle modulated square wave as its power frequency waveform.

3. The control circuit of claim 2 wherein said low pass filter is of the constant-k type.

4. The control circuit of claim 2 wherein said low pass filter is of the m-derived type.

5. The control circuit of claim 2 wherein said solid state duty cycle circuit signals are gating signals applied to the control elements of one or more solid state switching elements within said inverter.

6. The control circuit of claim 2 wherein said altered duty cycle is rapidly lowered by said solid state duty cycle circuit upon restarting the discharge lamp so as to avoid unwanted power peaks of short duration.

7. A control circuit for energizing a gas discharge lamp over a wide range of lamp operating conditions, comprising:

(a) an input circuit for converting applied input power into a substantially DC voltage at its output;

(b) an inverter having first and second input nodes, said first node connected to receive said DC voltage for converting said DC voltage into a power frequency waveform at its output, said second node adapted to receive a feedback signal for controlling the frequency of said output power frequency waveform;

(c) a ballast comprising a low pass filter having an input inductor and an output inductor, said ballast connected to receive said output power frequency waveform and to provide a desired output current to the discharge lamp, said ballast exhibiting at a particular frequency $f_o$ a quadrature phase shift causing a reciprocal impedance transformation between its input and its output;

(d) a feedback circuit connected to said ballast and to said inverter node for controlling the output current-providing ability of said inverter, said feedback circuit comprising:

(i) a secondary winding inductively coupled to said input inductor for removing energy therefrom;

(ii) a rectifier to convert said removed energy into a DC feedback voltage;

(iii) a solid state frequency modulator circuit for converting said DC feedback voltage into a feedback frequency control signal applied to said second node for controlling the frequency of said output power frequency waveform;

(e) wherein at the particular frequency $f_o$ said discharge lamp exhibits substantially resistive impedance to said ballast; and, (f) whereby output current above a predetermined level causes a DC feedback voltage to alter the frequency of said power frequency waveform so as to restore and to maintain said desired output current.

8. A control circuit for energizing a discharge lamp over a wide range of lamp operating conditions, comprising:

(a) an input circuit for converting applied input power into a substantially DC voltage at its output;

(b) an inverter having an input node connected to receive said DC voltage and for converting said DC voltage into a power frequency waveform at its output;

(c) a ballast connected to receive said power frequency waveform and to apply a desired output current to the discharge lamp;

(d) a feedback circuit transformer/coupled to said ballast for removing energy therefrom, and connected to said inverter for controlling the effective amplitude of said power frequency waveform, said feedback circuit further including a rectifier for converting said energy into a DC feedback voltage for connection to said inverter input node;

(e) wherein said power frequency waveform is set at a particular frequency at which said discharge lamp exhibits substantially resistive impedance to said ballast; and, (f) wherein said ballast is configured to exhibit at said particular frequency a quadrature phase shift through the ballast thereby causing a reciprocal impedance transformation between its input and output which provides a desired constant output current to said discharge lamp over a range of lamp operating conditions.

9. The control circuit of claim 8 wherein said input power is AC and said input circuit is a rectifier.

10. The control circuit of claim 8 wherein said inverter includes one or more switching elements operated at said particular frequency and said power frequency waveform is a square wave.

11. The control circuit of claim 8 wherein said ballast is a low pass filter of the constant-k type.

12. The control circuit of claim 8 wherein said ballast is an m-derived low pass filter.

13. The control circuit of claim 8 wherein output current above a predetermined level causes said DC feedback voltage to algebraically add with said DC voltage to control the effective amplitude of said power frequency waveform to restore said desired output current.

14. The control circuit of claim 13 wherein said output current above a predetermined level causes said DC feedback voltage to remove additional energy from said ballast thereby limiting the current drawn by said discharge lamp and further restoring said desired output current.

15. A control circuit for energizing a discharge lamp over a wide range of lamp operating conditions, comprising:

(a) an input circuit including a bridge rectifier for converting applied AC input power into a substantially DC output voltage;

(b) an inverter having an input node connected to receive said substantially DC output voltage, and including at least one solid state switching element for producing a square wave power frequency waveform having a particular frequency;

(c) a ballast comprising a low pass filter including an input inductor and an output inductor, said ballast connected to receive said square wave power frequency waveform and to apply a desired output current to the discharge lamp;

(d) a feedback circuit including a secondary winding inductively coupled to the input inductor of said ballast for removing energy therefrom, and further including a rectifier to convert the removed energy into a DC feedback voltage for connection to the input node of said inverter, whereby said desired output current is maintained;

(e) wherein said particular frequency is set at a frequency at which said discharge lamp exhibits substantially resistive impedance to said ballast; and, (f) wherein said ballast is configured to exhibit at said particular frequency a quadrature phase shift through the ballast thereby causing a reciprocal impedance transformation between its input and output which provides a desired constant output current to said discharge lamp over a range of lamp operating conditions.

16. A control circuit for energizing a discharge lamp over a range of lamp operating conditions, comprising;

(a) an input circuit including a bridge rectifier for converting applied AC input power into a substantially DC output voltage;

(b) an inverter having an input node connected to receive said substantially DC output voltage, and including at least one solid state switching element for producing a square wave power frequency waveform having a particular frequency;

(c) a ballast comprising an artificial delay line connected to receive said square wave power frequency waveform and to provide a desired output current to the discharge lamp, said ballast exhibiting at said particular frequency a quadrature phase shift causing a reciprocal impedance transformation between its input and output which provides a desired constant output current to said lamp over a range of operating conditions;

(d) a feedback circuit connected to said ballast and to said inverter for controlling the effective amplitude of said power frequency waveform, said feedback circuit including a transformer for coupling the output voltage from said ballast to said input node; and, (e) wherein said particular frequency is set such that said discharge lamp exhibits substantially resistive impedance to said ballast.

17. A control circuit for energizing a discharge lamp over a range of lamp operating conditions, comprising:

(a) an input circuit for converting applied input power into a substantially DC voltage at its output;

(b) an inverter having an input node connected to receive said DC voltage for converting it into a power frequency waveform at a particular frequency at its output;

(c) a ballast comprising an artificial delay line connected to receive said power frequency waveform and to provide a desired output current to the discharge lamp, said artificial delay line including a multisection filter of similar cascaded sections, each section having an input series inductor and an output shunt capacitor, said ballast exhibiting at said particular frequency a quadrature phase shift causing a reciprocal impedance transformation between its input and output which provides a desired constant output current to said lamp over a range of operating conditions;

(d) a feedback circuit connected to said ballast and to said inverter for controlling the effective amplitude of said power frequency waveform, said feedback circuit including a transformer connected in parallel with the final capacitor of said multisection filter for coupling the output voltage from said ballast to said input node; and, (e) wherein said particular frequency is set such that said discharge lamp exhibits substantially resistive impedance to said ballast.

18. The control circuit of claim 17 wherein said transformer comprises a primary winding connected in parallel with a shunt capacitance of the final section of said multisection filter, and a secondary winding connected via a rectifier in parallel with the DC voltage at said inverter input node to effectively control the amplitude of said power frequency waveform to restore said desired output current.

19. The control circuit of claim 18 wherein the output from said transformer secondary is converted by rectification into a substantially DC feedback voltage at its output for application to said input node for controlling said desired output current.

* * * * *